United States Patent
Harel et al.

(10) Patent No.: US 8,884,171 B2
(45) Date of Patent: Nov. 11, 2014

(54) PEN TRANSCRIPTION SYSTEM WITH IMPROVED NOISE REJECTION

(75) Inventors: Jacob Harel, Redwood City, CA (US);
Yao Ding, Sunnyvale, CA (US);
Raphael Holtzman, San Mateo, CA (US); Bradley Richter, San Mateo, CA (US); Daniel Peter Manian, San Carlos, CA (US); Lindsey Michelle Sunden, San Francisco, CA (US); Carrie Ann Edwards, Palo Alto, CA (US);
Bernardo Núnez Rojas, Palo Alto, CA (US)

(73) Assignee: Luidia Inc., San Carlos, CA (US)

( * ) Notice: Subject to any disclaimer, the term of this patent is extended or adjusted under 35 U.S.C. 154(b) by 967 days.

(21) Appl. No.: 12/786,282

(22) Filed: May 24, 2010

(65) Prior Publication Data

US 2011/0284296 A1    Nov. 24, 2011

(51) Int. Cl.
*G06F 3/043*    (2006.01)
*G06F 3/0354*    (2013.01)

(52) U.S. Cl.
CPC ............ *G06F 3/03545* (2013.01); *G06F 3/043* (2013.01)

USPC ..................... 178/18.04; 178/19.02; 345/177

(58) Field of Classification Search
USPC ..................... 345/173, 177; 178/18.04, 19.02
See application file for complete search history.

(56) References Cited

U.S. PATENT DOCUMENTS

| | | | |
|---|---|---|---|
| 8,089,827 B2 * | 1/2012 | Carotenuto | 367/128 |
| 2007/0120834 A1 * | 5/2007 | Boillot | 345/173 |
| 2008/0084789 A1 * | 4/2008 | Altman | 367/127 |
| 2012/0030613 A1 * | 2/2012 | Moshiri et al. | 715/784 |
| 2012/0044786 A1 * | 2/2012 | Booij et al. | 367/127 |

* cited by examiner

*Primary Examiner* — Jonathan Boyd
(74) *Attorney, Agent, or Firm* — Inventek; Dov Rosenfeld

(57) ABSTRACT

A transcription module having a mounting unit, acoustical receivers and an EM detector is disclosed. The mounting unit is adapted for positioning the transcription module over a work surface. First and second acoustical receivers are attached to the mounting unit. Each acoustical receiver includes a microphone positioned over a corresponding location on the work surface. Each microphone views the work surface at the corresponding location and is configured to receive acoustical signals from an input device operating over the work surface at another location. The EM detector detects an EM signal that is synchronized with the acoustical signals.

13 Claims, 7 Drawing Sheets

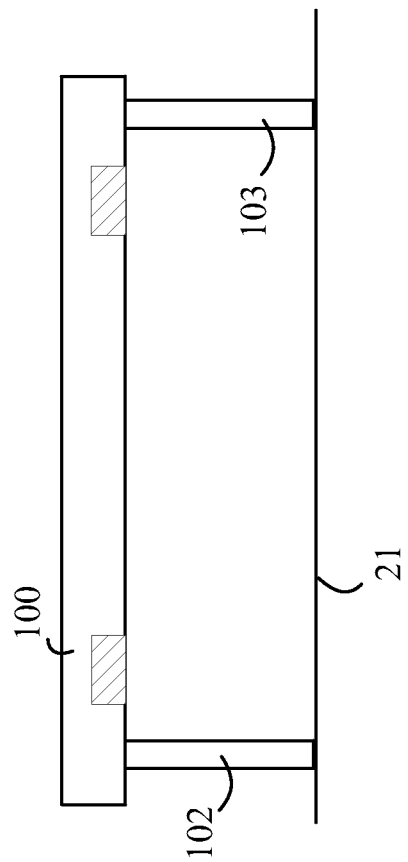
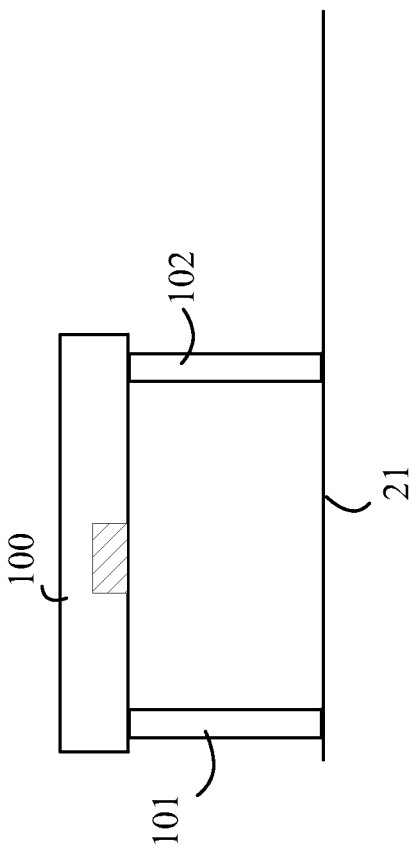

PEN TRANSCRIPTION SYSTEM WITH IMPROVED NOISE REJECTION

Acoustic-based distance measuring systems have been used to compute the position of a data entry object in a writing field for some time. For example, schemes that track and record the position of a pen on a white board or other surface are commercially available. As the user "writes" on the white board, the transcription system determines the location of the pen on the board and records the location for later use.

In some systems, a conventional marking pen of the type used with white boards is inserted into a housing that includes an acoustical transmitter and an infrared transmitter. As the user writes on the white board in the conventional manner, the transmitter sends a combination of acoustical and infrared pulses. Two receivers that are separated in space receive the signals generated by the housing. Each receiver measures the time difference between the time of arrival of the infrared pulse and the acoustical pulse to determine the distance of the housing from that receiver. These distance measurements are then combined to determine the position of the housing relative to the receivers.

In other systems, the writing surface is actually a display generated by a projector or computer. In these systems, the "pen" does not actually deposit ink on the surface. Instead, the position of the pen is tracked by the device creating the display, and the display is modified by the addition of a line along the trajectory taken by the pen, thereby simulating writing on the display.

Infrared is used for the light signals to avoid problems with background light in the area of use. The acoustical signals are typically in the ultrasound range so that the signals are beyond the human audible range. In addition, the higher frequencies provide better spatial resolution. Each acoustical receiver is typically constructed from a microphone such as a ceramic piezo microphone, PVDF films, a condenser microphone, an electrets condenser microphone (ECM), a moving coil microphone, etc.

The pen transcription system must operate in the presence of various noise sources that are generated by other pen transcription systems in the room or by background ultrasound sources. For example, some motion detectors utilize an ultrasound signal to detect an object moving within the field of view of the motion detector. These narrow band sources can have a signal strength that is sufficient to mask the ultrasound signal from the pen in the transcription system. The transcription system pen is typically battery powered, and hence, cannot compete with a motion detector that is powered from an AC power source and generates a signal having an amplitude that is sufficient to detect the change in frequency of the signal after the signal has been reflected from a moving object. Similarly, there may be more than one operating pen transcription system in a room. For example, a classroom may have a number of "virtual" whiteboards on the classroom wall with different groups of students working at each whiteboard. The ultrasound receivers at each whiteboard must be able to distinguish their signal from signals originating at other white boards.

SUMMARY OF THE INVENTION

The present invention includes a transcription module having a mounting unit, acoustical receivers and an electromagnetic (EM) detector. The mounting unit is adapted for positioning the transcription module over a work surface. First and second acoustical receivers are attached to the mounting unit. Each acoustical receiver includes a microphone positioned over a corresponding location on the work surface. Each microphone views the work surface at the corresponding location and is configured to receive acoustical signals from an input device operating over the work surface at another location. The EM detector detects an EM signal that is synchronized with the acoustical signals.

BRIEF DESCRIPTION OF THE DRAWINGS

FIGS. 7A and 7B illustrate a pen tracking module having legs for setting the microphone-to-work surface distance. FIG. 7A is an end view of pen tracking module 100, and FIG. 7B is a side view of pen tracking module 100.

DETAILED DESCRIPTION OF THE PREFERRED EMBODIMENTS OF THE INVENTION

Figure 1:
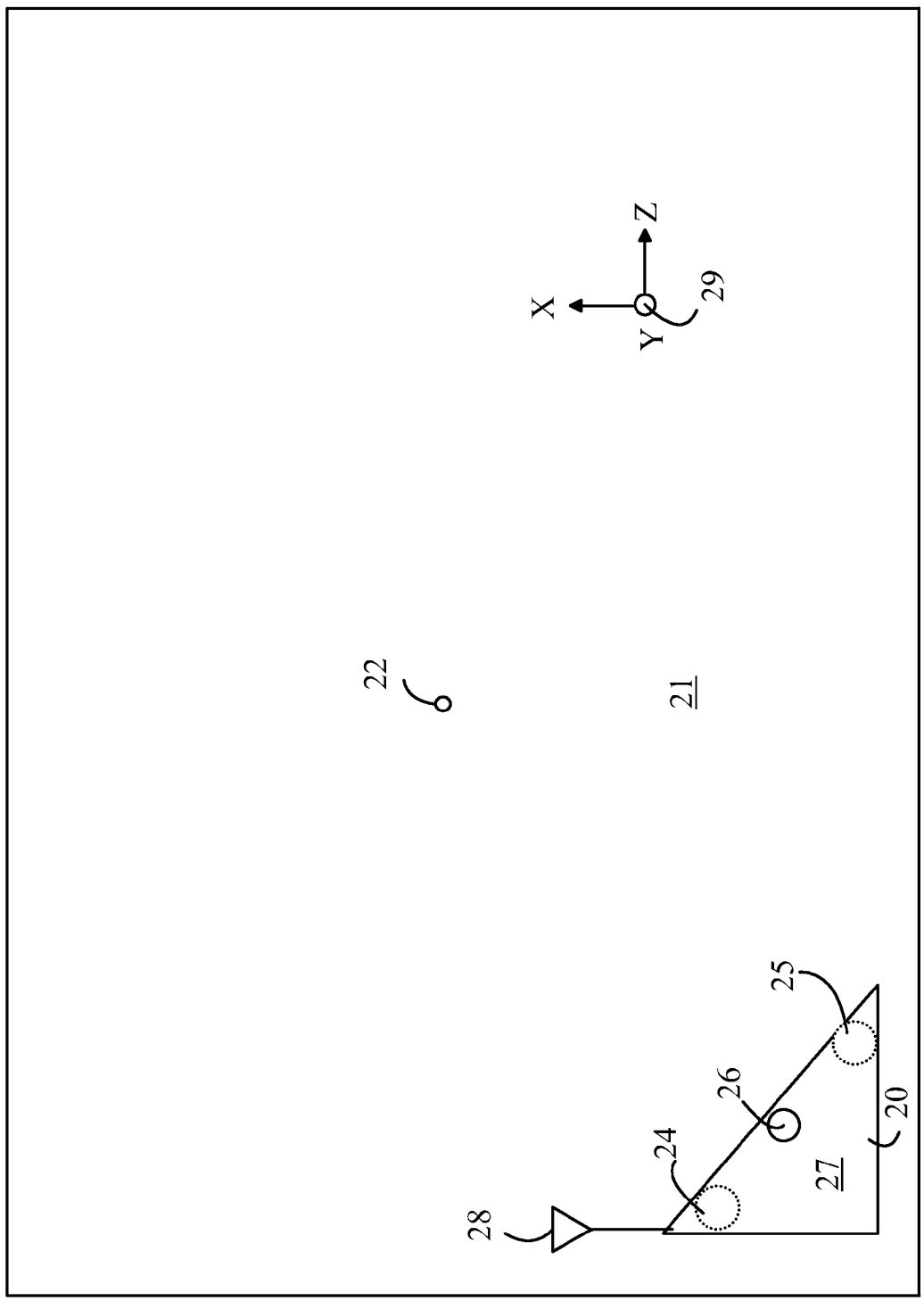
FIG. 1 illustrates a prior art pen transcription system.

The manner in which the present invention provides its advantages can be more easily understood with reference to FIG. 1, which illustrates a prior art pen transcription system. Pen transcription system 20 operates in conjunction with an input device 22 whose position is determined relative to a coordinate system 29 that is defined for work surface 21. The tracking can be initiated by activating a hand-operated switch on input device 22 or a switch that is actuated when input device 22 is in contact with work surface 21.

Pen transcription system 20 is attached to one edge of work surface 21. Input device 22 emits both an EM signal and an acoustical signal in response to the user engaging a switch on the input device. The acoustical signal is typically in the ultrasound frequency range of 30 KHz to 80 KHz. Pen transcription system 20 includes an EM receiver 26 and two acoustical receivers 24 and 25. A controller 27 computes the distance from input device 22 to each of the acoustical receivers by measuring the difference in arrival time between the acoustical signals received at the receivers and the EM signal. The computed position is forwarded to client device 28 such as a computer for use in recording the material that was written on the work surface.

To simplify the following discussion, a Cartesian coordinate system will be utilized in which the work surface is in the X-Z plane with the Y-axis pointing out of the plane of the drawing as shown at 29. Ideally, each of the acoustical receivers has a reception pattern that exhibits uniform gain for all points on or near the working surface in the X-Z plane with a decreasing gain as a function of Y so that sources that are significantly off the work surface are received with significantly reduced strength.

Figure 2:
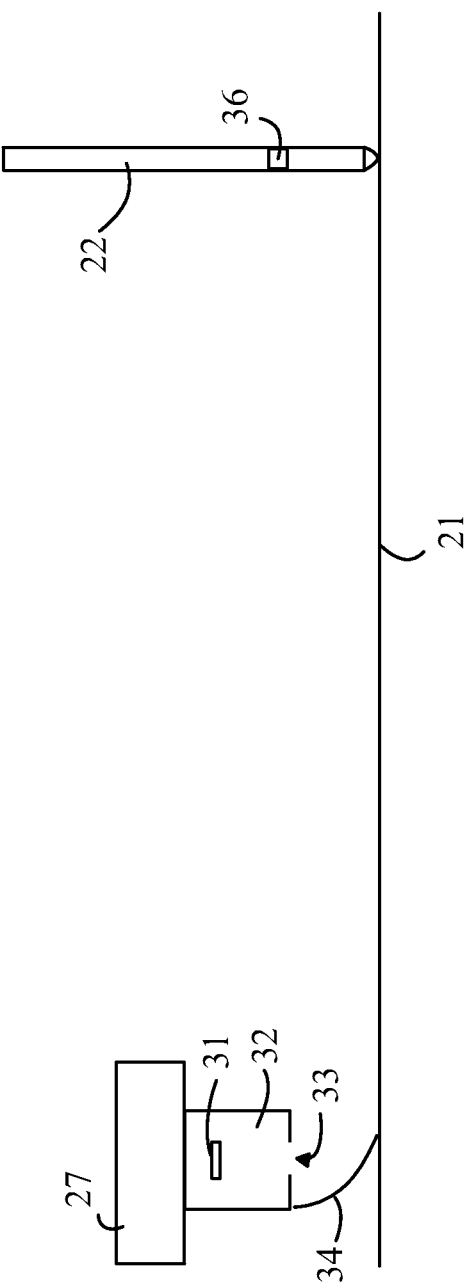
FIG. 2 is a cross-sectional view of an input device 42 in relation to one of the acoustical receivers in transcription system 20.

Refer now to FIG. 2, which is a cross-sectional view of an input device 22 in relation to one of the acoustical receivers in transcription system 20. The acoustical receiver is constructed from a microphone 31 that is contained within a housing 32 that includes an aperture 33 through which the ultrasound waves enter. Acoustical signals generated by acoustical transmitter 36 in input device 22 are deflected into housing 32 by a deflector 34. Unfortunately, acoustical signals that arise from sources that are far from working surface 21 are also deflected into housing 32.

Figure 3:
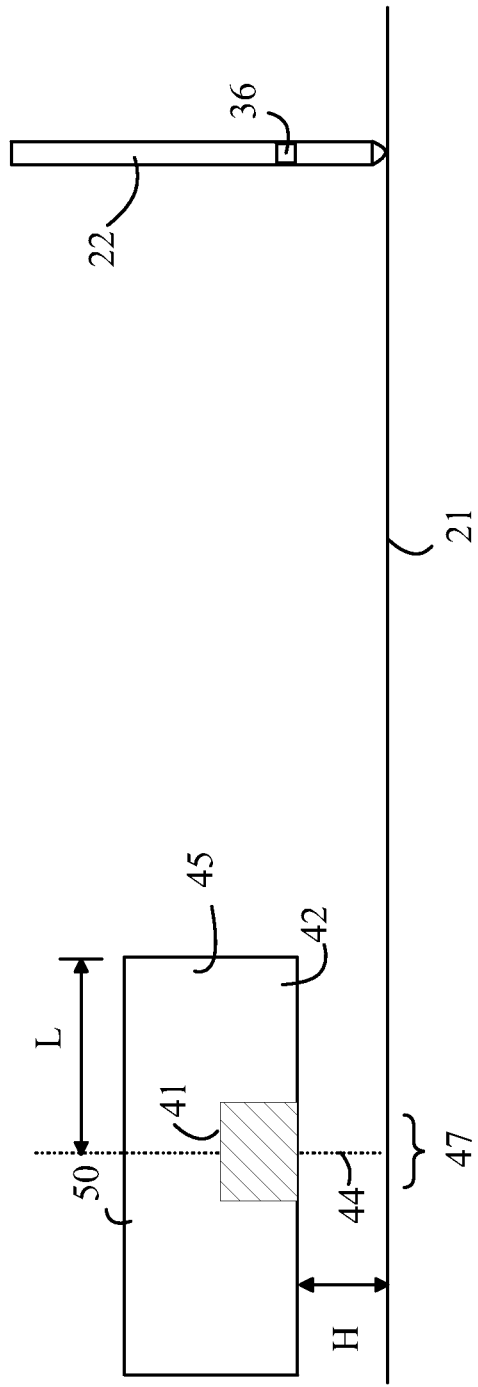
FIG. 3 is a cross-sectional view of an input device in relation to an acoustical receiver according to one embodiment of the present invention.

The present invention is based on the empirical observation that eliminating the deflector and providing the proper distance between the acoustical receiver and the working surface improves the acoustical signal-to-noise ratio. Refer now to FIG. 3, which is a cross-sectional view of an input device in relation to an acoustical receiver according to one embodiment of the present invention. Acoustical receiver 50 is constructed from a housing having a microphone 41 located therein. Microphone 41 is pointed toward work surface 21 such that the normal 44 to microphone input surface that contains the sound entry orifice intersects work surface 21 at approximately a right angle. That is, acoustical microphone 42 "views" the planar surface of the work surface directly under acoustical receiver 50. For the purposes of the present discussion, the microphones will be defined as viewing the planar surface under the work surface if the field of view of the microphone includes the work surface area under overhang 45. In general, a microphone will be said to view an object if there is a line of sight path from the microphone to the object, or the path includes, at most, one reflective surface.

In general, the optimum placement for acoustical receiver 50 relative to work surface 21 depends on the specific acoustical frequency used by input device 22. In one embodiment, the distance, H, from aperture 43 to work surface 21 is between 1 mm and 8 mm for acoustical transmitters having frequencies between 20 kHz and 100 kHz. In a more specific embodiment, H is between 1.5 mm and 3 mm for acoustical transmitters having frequencies between 20 kHz and 100 kHz.

In one aspect of the invention, acoustic receiver 50 includes an overhang 45 that helps to shield area 47 on the work surface from signals arising at locations significantly above work surface 21. The overhang, together with the portion of the work surface under the microphone, forms a cavity that inhibits the reception of sound waves from sources that are further from the surface of the work surface than a predetermined distance corresponding to the highest valid sound source that is consistent with a pen transmitting its location to acoustical receiver 50. The predetermined distance in question is typically less than a few inches. In one embodiment, overhang 45 has L between 10 mm and 60 mm. The overhang also protects the microphones from dust and other environmental hazards, as well as limiting access to the microphones in classroom settings.

Figure 4:
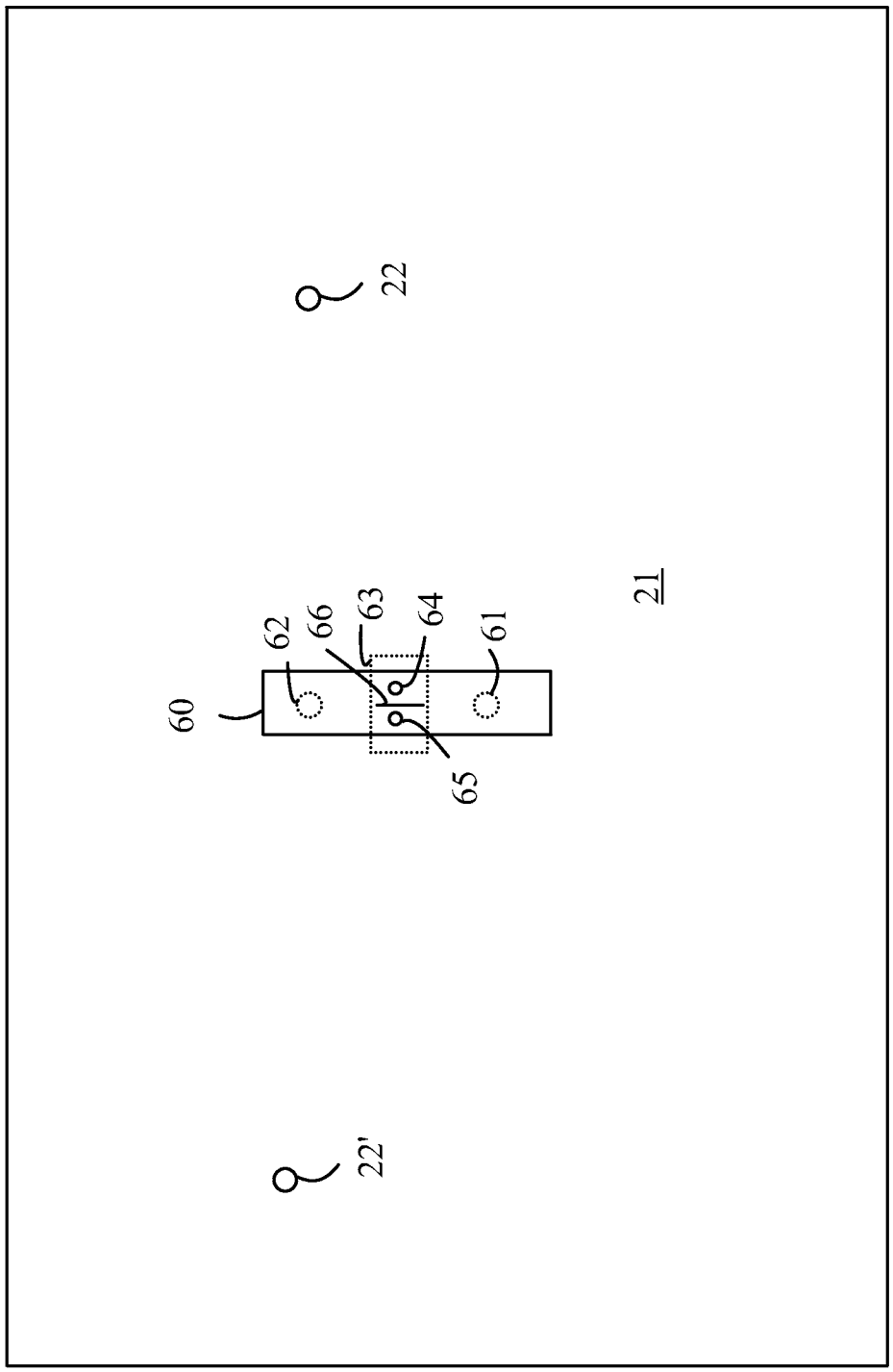
FIG. 4 is a top view of a pen tracking module 60 according to another aspect of the present invention.

It should be noted that acoustic receiver 50 can view an input device on either side of acoustic receiver 50, and hence, the available field of view is approximately twice that of a conventional device that is mounted on an edge or corner of the work surface. Refer now to FIG. 4, which is a top view of a pen tracking module 60 according to another aspect of the present invention. Pen tracking module 60 includes two acoustic receivers shown at 61 and 62 that are mounted such that the acoustic receivers view the work surface in a region under pen tracking module 60 as discussed above with reference to FIG. 3. By mounting pen tracking module 60 within the work surface area, pen tracking module 60 can measure the location of input device 22 or an input device 22' on the other side of pen tracking module 60. Since there is a maximum distance over which pen tracking module 60 can detect and measure the position of the input device, this arrangement effectively doubles the size of the useable work surface.

However, if both sides of pen tracking module are to be utilized, some mechanism must be provided to determine on which side of pen tracking module 60 input device 22 is located. Pen tracking module 60 includes an EM receiver 63 such as an infrared receiver that is utilized in measuring the distance from input device 22 to each of the acoustic receivers in pen tracking module 60. The EM receiver can be constructed in a manner that determines on which side of pen tracking module 60 input device 22 is located by utilizing two receivers 64 and 65 that are separated by a baffle 66 that limits the field of view of each receiver to one side of pen tracking module 60.

Figure 5:
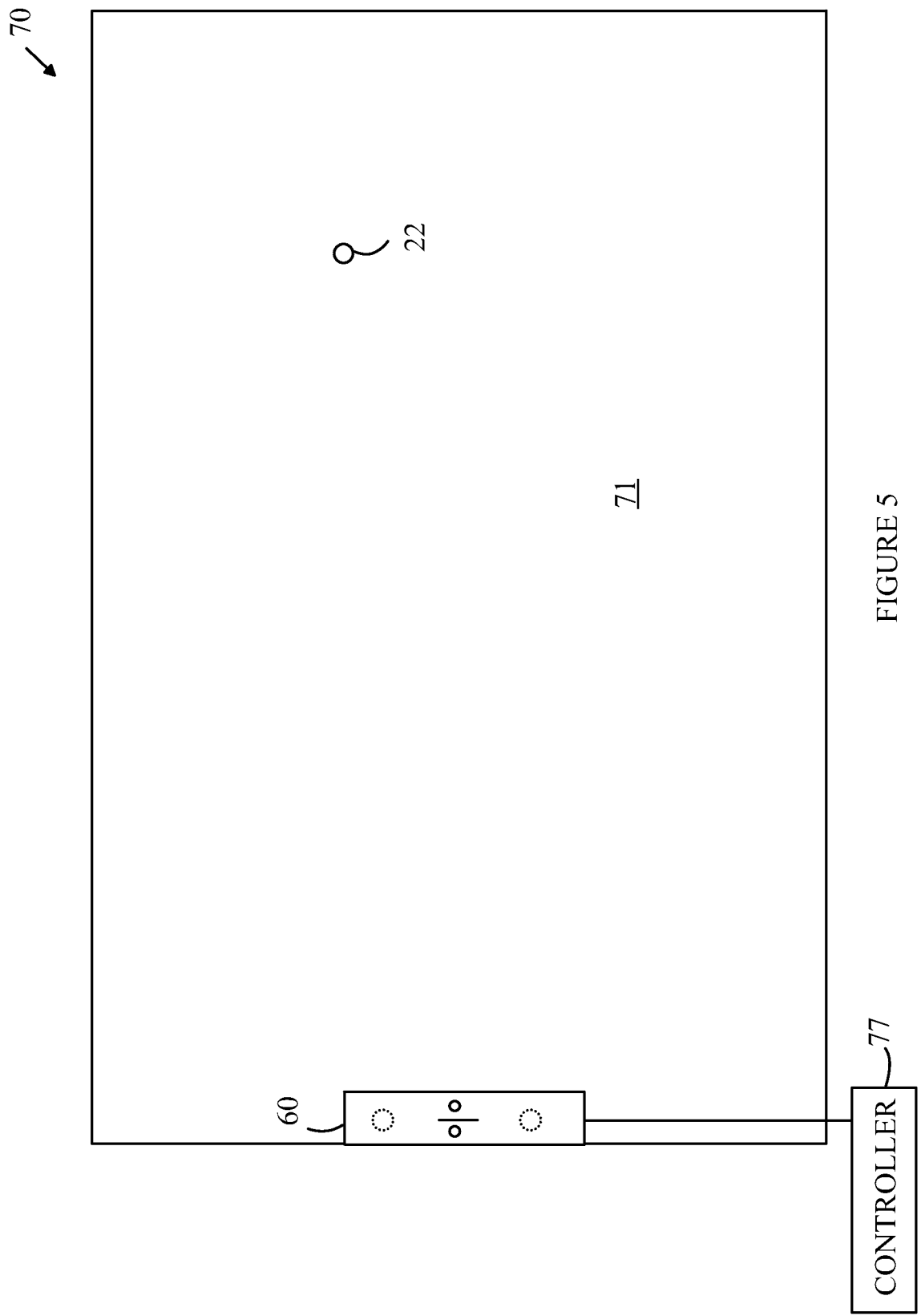
FIG. 5 illustrates a display system according to one embodiment of the present invention.

Refer now to FIG. 5, which illustrates a display system having a pen tracking system according to one embodiment of the present invention. Display system 70 includes a display 71 that provides an image that is generated by a computer or similar device. Display 71 can be, for example, a large LCD screen on which a presentation is generated. Pen tracking module 60 is mounted at one edge of display 71 and tracks input device 22. Pen tracking module 60 transmits the coordinates of input device 22 to controller 77 that generates the display and controls the operations of the display system. The inputs to controller 77 are triggered by switches on input device 22. These switches can be actuated by a user pressing a button on the input device or by the input device being pressed against work surface 71.

Typically, controller 77 is remote from display 71 in that the user cannot conveniently enter commands on the keyboard of the controller while working at the display surface. In some systems, controller 77 is connected to the display system by a wireless communication link and located some distance from the display itself. Hence, it would be advantageous to provide a mechanism that allows the user to input additional data to controller 77 without having to leave the display.

Figure 6:
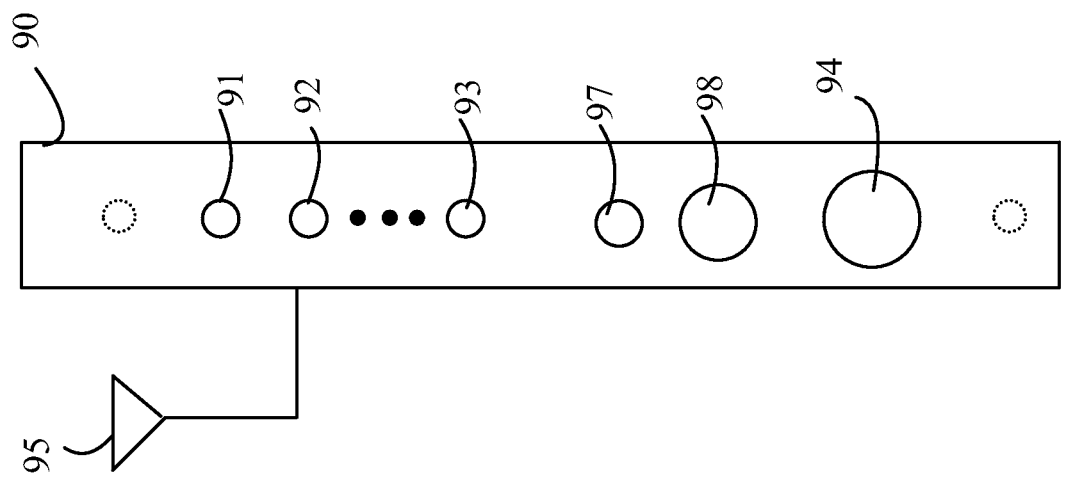
FIG. 6 is a top view of another embodiment of pen tracking module according to the present invention.

In another aspect of the present invention, the pen tracking module itself provides additional input devices for communicating with the controller from the location of the display. Refer now to FIG. 6, which is a top view of another embodiment of a pen tracking module according to the present invention. Pen tracking module 90 includes acoustic receivers and infrared receivers that track the position of an input device such as input device 22 discussed above. Pen tracking module 90 also includes a number of buttons such as buttons 91-93 and other input devices such as scroll knob 94 that are utilized by the user to signal the system controller when the user is at the display. Pen tracking module 90 also includes one or more communication links such as link 95 that are utilized to communicate with other input/output devices. For example, pen tracking module 90 can include a Bluetooth™ link for communicating with a headset used by the user to receive input from the controller or to transmit oral comments to the controller for recording or broadcasting to the audience. In addition, pen tracking module 90 can also include a microphone 97 and/or a speaker 98 in lieu of a headset.

In the above-described embodiments, the distance between the microphone input orifice and the work surface is set. However, embodiments in which the distance can be varied at the time the system is set up can also be constructed. The optimum distance between the microphones and the work surface depends on the size of the work surface and noise levels in the area in which the display system is operated. Larger distances provide increased signal strength at the microphone, which is useful with large work surfaces. However, large separations also increase the extent to which unwanted signals can reach the microphones, and hence, present problems in noisy environments.

In one aspect of the present invention, the pen tracking module includes a mechanism for setting the height of the microphones over the work surface so that the signal-to-noise ratio can be optimized during the setup of the display system using that pen tracking module. Refer now to FIGS. 7A and 7B, which illustrate a pen tracking module having legs for setting the microphone-to-work surface distance. FIG. 7A is an end view of pen tracking module 100, and FIG. 7B is a side view of pen tracking module 100. Pen tracking module 100 includes legs 101-103 that set the distance between the microphones and work surface 21. The legs can include screw jacks that determine the length of the legs. Alternatively, the legs can be removable and interchangeable with legs of different lengths that are supplied with the pen tracking module. A test protocol can be provided with the pen tracking module to measure the signal-to-noise ratio of the input device signal at various positions on the work surface and to compare the readings for different microphone-to-work surface distances during the setup of the system.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A transcription module comprising:
a mounting unit adapted for positioning said transcription module over a work surface;
first and second acoustical receivers attached to said mounting unit, each acoustical receiver comprising a microphone with a microphone input surface wherein acoustical signals enter to be received by said microphone, said microphone positioned over a corresponding location on said work surface and in close proximity to said work surface, each microphone pointing to said work surface at said corresponding location with the normal to the microphone input surface intersecting said work surface at approximately a right angle, each microphone configured to receive acoustical signals generated by an input device that includes an acoustical transmitter and operating over said work surface, wherein said acoustical receivers do not directly view said input device, and wherein said acoustical receivers are used to measure the location of said input device; and
a electromagnetic detector that detects an electromagnetic signal that is synchronized with said acoustical signals, wherein at least one of said acoustical receivers includes a physical sound shield to inhibit the reception of sound signals from sources that are significantly above said work surface.

2. The transcription module of claim 1 wherein said input device is characterized by a maximum distance from said work surface at which acoustical signals originated during a tracking operation are defined to be valid and wherein said sound shield attenuates signals originating from locations that are off of said working surface by more than said maximum distance.

3. The transcription module of claim 2 wherein said sound shield comprises a cavity in which said microphone corresponding to that acoustical receiver is located, said cavity having walls that inhibiting reception of sound waves originating at from locations that are off of said working surface by more than said maximum distance.

4. The transcription module of claim 1 wherein said microphones are contained in a housing having an input orifice and wherein said input orifice is between 1 mm and 8 mm from said work surface.

5. The transcription module of claim 4 wherein said input orifice is between 1.5 and 3 mm from said work surface.

6. The transcription module of claim 1 wherein said transcription module comprises a variable spacing mechanism for setting a distance between said acoustical receivers and said work surface.

7. The transcription module of claim 1 wherein said electromagnetic detector provides an output indicating a position for said input device relative to said transcription module.

8. The transcription module of claim 7 wherein said output indicates on which side of a line defined in relation to said transcription module said input device is located.

9. The transcription module of claim 1 further comprising an auxiliary input that receives commands from a user of said transcription module and transmits information about said commands to a controller coupled to said transcription module.

10. The transcription module of claim 9 wherein said controller controls a display that appears on said work surface.

11. The transcription module of claim 9 wherein said auxiliary input comprises a scroll wheel on said transcription module.

12. The transcription module of claim 9 wherein said auxiliary input includes a wireless communication link for receiving signals from an external input device.

13. The transcription module of claim 9 further comprising an output that generates a signal perceivable by an operator of said transcription module.

* * * * *